United States Patent [19]

Kubo et al.

[11] Patent Number: 5,452,005
[45] Date of Patent: Sep. 19, 1995

[54] AUTOMATIC FOCUSING DEVICE CAPABLE OF REMOVING NOISE COMPONENTS FROM FOCUSING CONTRAST INFORMATION

[75] Inventors: Naoki Kubo; Mikio Watanabe, both of Asaka, Japan

[73] Assignee: Fuji Photo Film Co., Ltd., Japan

[21] Appl. No.: 200,462

[22] Filed: Feb. 23, 1994

[30] Foreign Application Priority Data

Feb. 24, 1993 [JP] Japan .................. 5-035629

[51] Int. Cl.[6] ............................................. H04N 5/232
[52] U.S. Cl. .................................. 348/350; 348/353
[58] Field of Search ............... 354/400, 402; 348/345, 348/349, 353, 354, 355, 356, 350

[56] References Cited

U.S. PATENT DOCUMENTS

| | | | |
|---|---|---|---|
| 3,786,184 | 1/1974 | Pieters | 178/7.2 |
| 4,383,274 | 5/1983 | Inuiya | 358/227 |
| 4,706,124 | 11/1987 | Baba | 358/227 |
| 4,782,396 | 11/1988 | Park | 358/227 |
| 4,985,777 | 1/1991 | Kawada | 358/227 |
| 5,107,337 | 4/1992 | Ueda | 358/227 |
| 5,126,849 | 6/1992 | Senuma | 358/227 |

Primary Examiner—Wendy R. Greening

[57] ABSTRACT

In an automatic focusing device for an imaging apparatus, a band-pass filter separates high frequency components from a luminance signal. A window processing section extracts a part of the output of the band-pass filter which lies in a predetermined focus area. In a slice circuit, a first and a second high level priority circuit slice respectively positive components and negative components, which constitute the extracted signal, on the basis of a reference voltage generated by a reference voltage source. A differential amplifier amplifies a difference between the outputs of the two high level priority circuits. An absolute value circuit regulates the amplified signal to a predetermined polarity. A peak hold circuit transforms the output of the absolute value circuit to a sampled peak value signal. An integrating circuit integrates the peak values of the peak value signals every predetermined period of time so as to calculate an evaluation value for focusing.

18 Claims, 8 Drawing Sheets

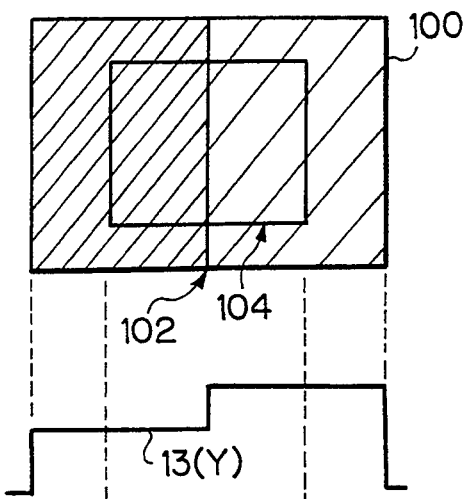
Fig. 3A
Fig. 3B VIDEO SIGNAL GENERATION 14
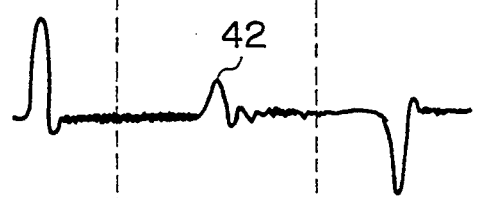
Fig. 3C BPF 30
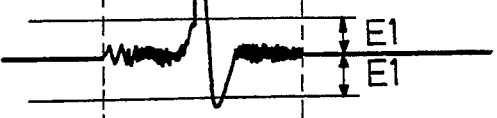
Fig. 3D WINDOW CKT 32
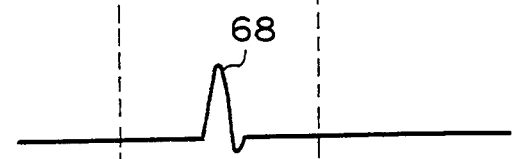
Fig. 3E SLICE CKT 34
Fig. 3F ABSOLUTE VALUE CKT 36
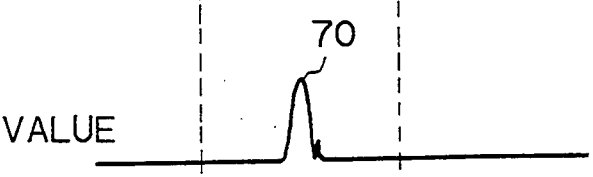
Fig. 3G PEAK HOLD CKT 38

Fig. 5B VIDEO SIGNAL GENERATION 14 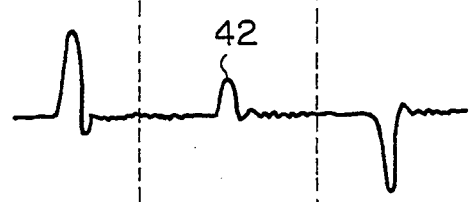
Fig. 5C BPF 30 
Fig. 5D WINDOW CKT 32 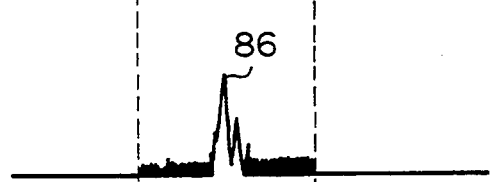
Fig. 5E ABSOLUTE VALUE CKT 36 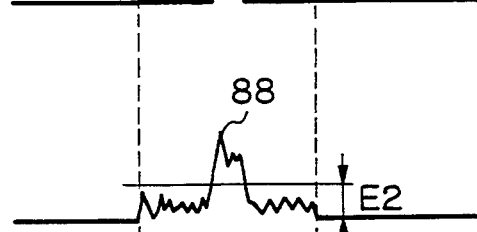
Fig. 5F PEAK HOLD CKT 38
Fig. 5G SLICE CKT 84 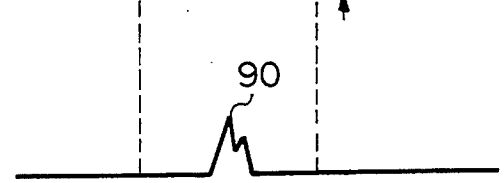

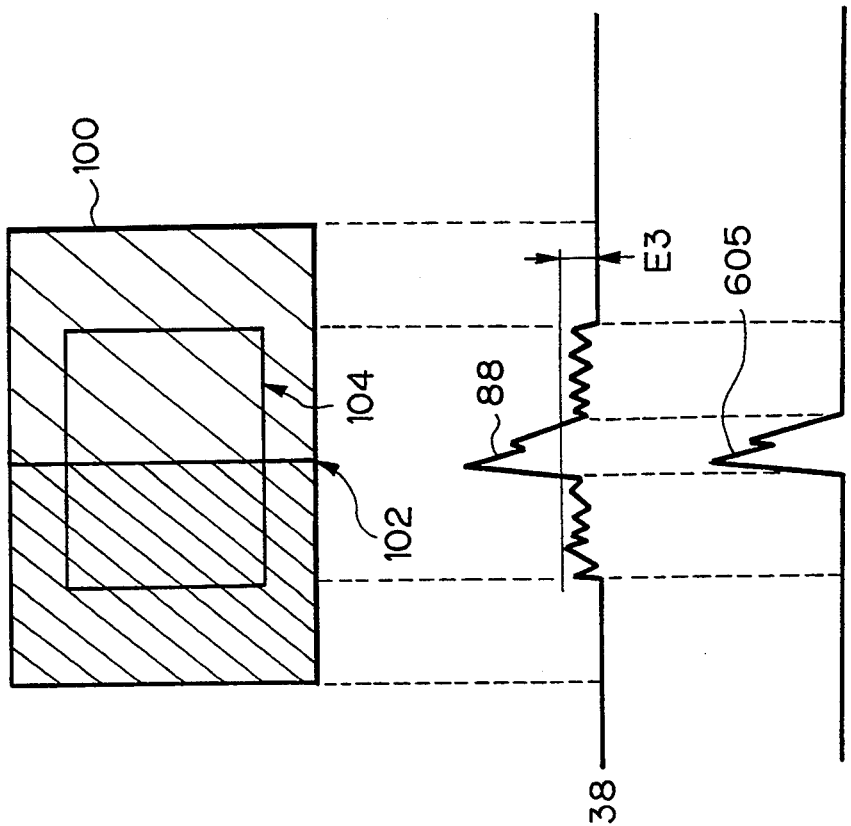

AUTOMATIC FOCUSING DEVICE CAPABLE OF REMOVING NOISE COMPONENTS FROM FOCUSING CONTRAST INFORMATION

BACKGROUND OF THE INVENTION

1. Field of the Invention

The present invention relates to an automatic focusing device feasible for a video signal generating apparatus capable of generating a video signal representative of an optical image, e.g., a video camera, still camera or similar imaging apparatus.

2. Description of the Background

Today, imaging apparatuses, including video cameras and still cameras, are extensively used which are capable of picking up a desired object in the form of an optical image via a lens and recording it in a magnetic tape, IC (Integrated Circuit) memory card or similar medium. It is a common practice with this kind of apparatus to mount an automatic focusing device which adjusts the position of the lens automatically so as to focus the optical image of an object onto the photosensitive surface of an image pick-up device.

Automatic focusing devices heretofore proposed include one which determines the sharpness of the image of an object and then moves the lens such that contrast, which is representative of the sharpness, becomes maximum. For example, this type of focusing device uses a focus area defined substantially at the center of a picture and calculates a contrast evaluation value out of high frequency components included in a luminance signal and representative of a contrast. Then, the device moves the lens automatically such that the contrast evaluation value becomes maximum. When such a contrast detection type device is mounted on a still camera capable of producing still pictures, it samples the contrast evaluation value at a plurality of (five to six) positions of a lens and then selects the greatest one of the sampled values.

However, the problem with the conventional contrast detection type automatic focusing device is that a signal representative of contrast evaluation values determined at the various positions of the lens contains noise components. As a result, errors are introduced in the contrast evaluation values. The noise components are generally attributable to noise particular to the image pick-up device and extraneous noise. Particularly, when the contrast of an object is too low to provide the device with sufficient contrast information, noise components become predominant and prevent accurate contrast evaluation values from being produced, thereby obstructing accurate automatic focusing. For example, assuming a dark scene where sufficient illumination is not available, then a video signal representative of the scene is amplified by a great amplification with the result that a great amount of noise components are relatively superposed on a luminance signal derived from the video signal. Since the contrast of an object located in such a scene is often low, the automatic focusing accuracy is further aggravated.

Moreover, a still camera for producing still pictures determines a plurality of contrast evaluation values at a plurality of positions of a lens and then selects the greatest one of them by calculation, as stated previously. Therefore, when the contrast evaluation values are inaccurate, it is impossible to estimate the greatest value which is the key to accurate automatic focusing.

SUMMARY OF THE INVENTION

It is, therefore, an object of the present invention to provide an automatic focusing device capable of adjusting the focus of a lens with high accuracy even when the contrast of an object is low.

In accordance with the present invention, an automatic focusing device for focusing the image of an object incident to an image pick-up device via a lens comprises a contrast information separating circuit for separating a contrast signal representative of a contrast from a luminance signal generated by the image pick-up device, an extracting circuit for extracting a predetermined part of the contrast signal lying in a focus area which is defined in a picture represented by the contrast signal, a removing circuit for removing noise signal components of a predetermined level from the extracted part of the contrast signal, an integrating circuit for integrating the contrast signals, from which the noise signal components of the predetermined level have been removed, to thereby calculate an evaluation value for focusing, a deciding circuit for determining a focus condition on the basis of the evaluation value, and then selecting a direction in which the lens is to be moved, and a driving circuit for driving the lens on the basis of the result of decision of the deciding circuit. The removing circuit includes a reference voltage source for generating a reference voltage defining the predetermined level.

Also, in accordance with the present invention, an automatic focusing device for focusing the image of an object incident to an image pick-up device via a lens comprises a contrast information separating circuit for separating, from a picture represented by a luminance component of a video signal generated by the image pick-up device, high frequency components of the luminance component which are representative of contrast information to thereby produce a contrast signal, an extracting circuit for extracting a predetermined part of the contrast signal lying in a focus area which is defined in the picture, an integrating circuit for removing noise components of the extracted parts and integrating the noiseless extracted parts of the contrast signal to thereby calculate an evaluation value for focusing, a deciding circuit for determining a focus condition on the basis of the evaluation value, and then selecting a direction in which the lens is to be moved, and a driving circuit for driving the lens on the basis of the result of decision of the deciding circuit. The integrating circuit has a reference voltage source for generating a reference voltage defining a predetermined level, and a comparing circuit for comparing the extracted part of the contrast signal with the reference potential. The integrating circuit integrates, based on the result of comparison output from the comparing circuit, which represents the noiseless extracted parts of the contrast signal to thereby calculate the evaluation value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects and features of the present invention will become more apparent from the consideration of the following detailed description taken in conjunction with the accompanying drawings which are given by way of illustration only and thus are not limitative of the present invention, and in which:

FIGS. 3A-3G show specific waveforms of signals appearing in the circuitry of FIG. 2;

FIGS. 5A-5G show specific waveforms of signals appearing in the circuitry of FIG. 4;

FIGS. 7A-7C show specific waveforms of signals appearing in the circuitry of FIG. 6.

DESCRIPTION OF THE PREFERRED EMBODIMENT

Figure 1:
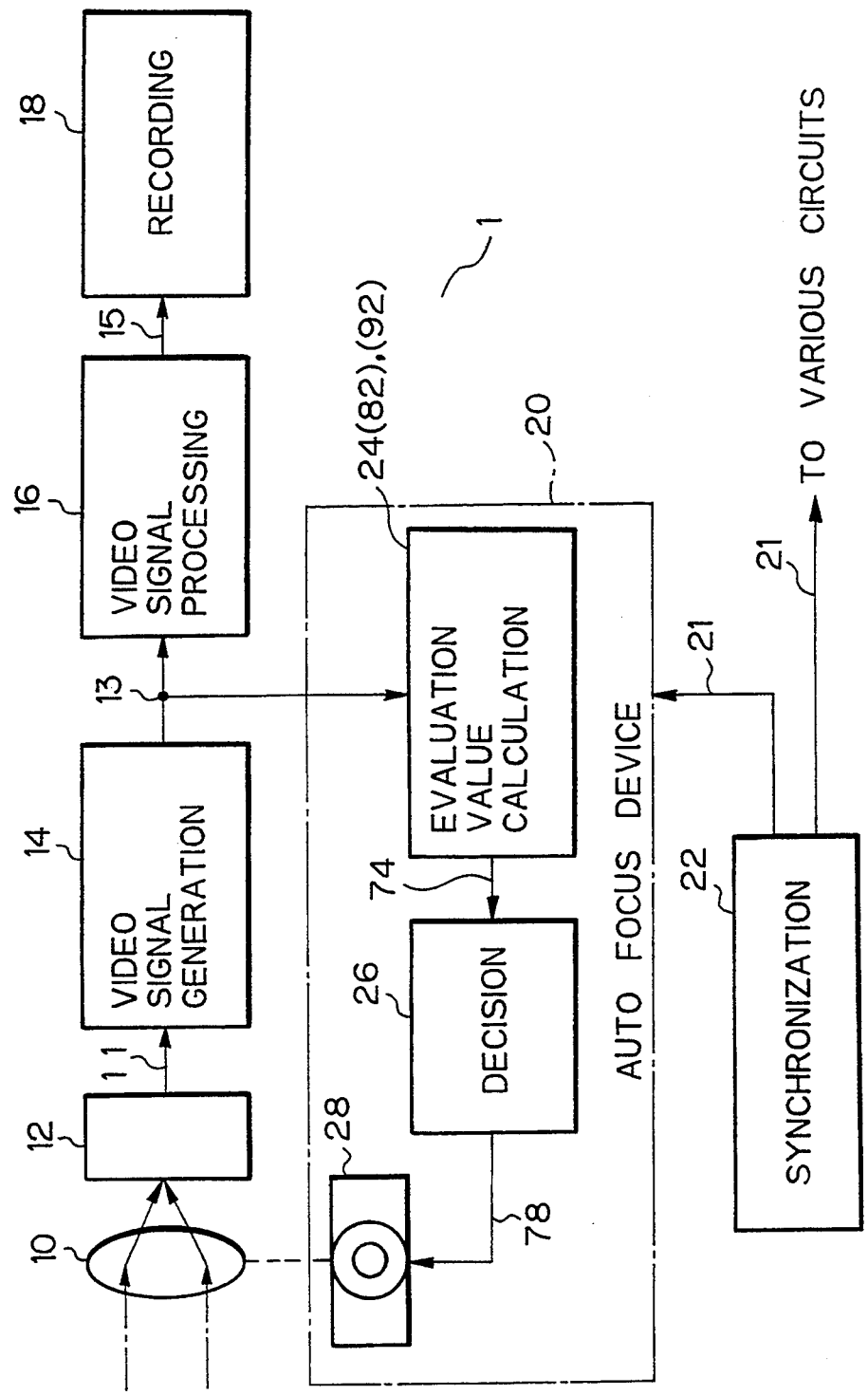
FIG. 1 is a block diagram schematically showing a video camera implemented by an automatic focusing device embodying the present invention.

Referring to FIG. 1 of the drawings, an imaging apparatus implemented by an automatic focusing device embodying the present invention is shown and implemented as a video camera by way of example. As shown, the video camera, generally 1, has a lens 10 for focusing the image of an object to be picked up by the camera. The video camera 1 is of the type adjusting the focal position of the lens 10 by the previously stated contrast detection principle automatically, and recording on a magnetic tape or similar data storing medium a video signal representative of an optical image focused by the lens 10. In the following description, signals are each designated by a reference numeral designating a particular connection line on which it appears. Conventional arrangements included in the camera 1 are not shown or described to facilitate an understanding of the present invention.

The camera 1 has a photosensitive section 12 including a n image pick-up device implemented by CCDs (Charge Coupled Devices), not shown. As an optical image representative of a desired object is focused onto the photosensitive section 12 via the lens 10, the section 12 transforms it to an electric signal and produces the signal on the output terminal 11 thereof. A video signal generating section 14 scans the output of the photosensitive section 12 horizontally so as to generate a chrominance signal C and a luminance signal Y out of every horizontal scanning line. A video signal processing section 16 is connected to the output terminal 13 of the video signal generating section 14. On receiving t h e chrominance signal C and luminance signal Y, the processing section 16 produces a composite video signal and outputs it on the output terminal 15 thereof. A recording section 18 records the composite video signal, or video data, fed from the video signal processing section 16 on a magnetic tape or similar recording medium. An automatic focusing device 20 embodying the present invention adjusts the focal position of the lens 10 in response to the luminance signal Y appearing on the output terminal 13 of the video signal generating section 14 and a horizontal and a vertical scanning signal. A synchronizing section 22 generates a reference signal, on which the entire operation of the camera 1 is based, and produces a composite synchronizing signal from the reference signal. The reference signal and composite synchronizing signal are distributed from the synchronizing section 22 to various sections of the camera 1, including the focus adjusting device 20, via the output terminal 21.

The focus adjusting device 20 is made up of an evaluation value calculation circuit 24, a decision circuit 26, and a lens drive motor 28. The evaluation value calculation circuit 24 receives the luminance signal Y from the video signal generating section 14 and the horizontal and vertical scanning signals and, based on these signals, calculates evaluation values for focusing. FIG. 3A shows a specific picture 100 representative of an object having a contrast between the right and left portions thereof with respect to an imaginary vertical boundary line 102. FIG. 3B shows the output 13 of the video signal generating section 14, i.e., luminance signal Y derived from the picture 100. As shown in FIG. 3A, a focus area 104 is defined at the center of the picture 100. The evaluation value calculation circuit 24 integrates the high frequency components of a part of the luminance signal Y which lies in the focus area 104, and then calculates an evaluation value for automatic focusing out of the resulting value.

Figure 2:
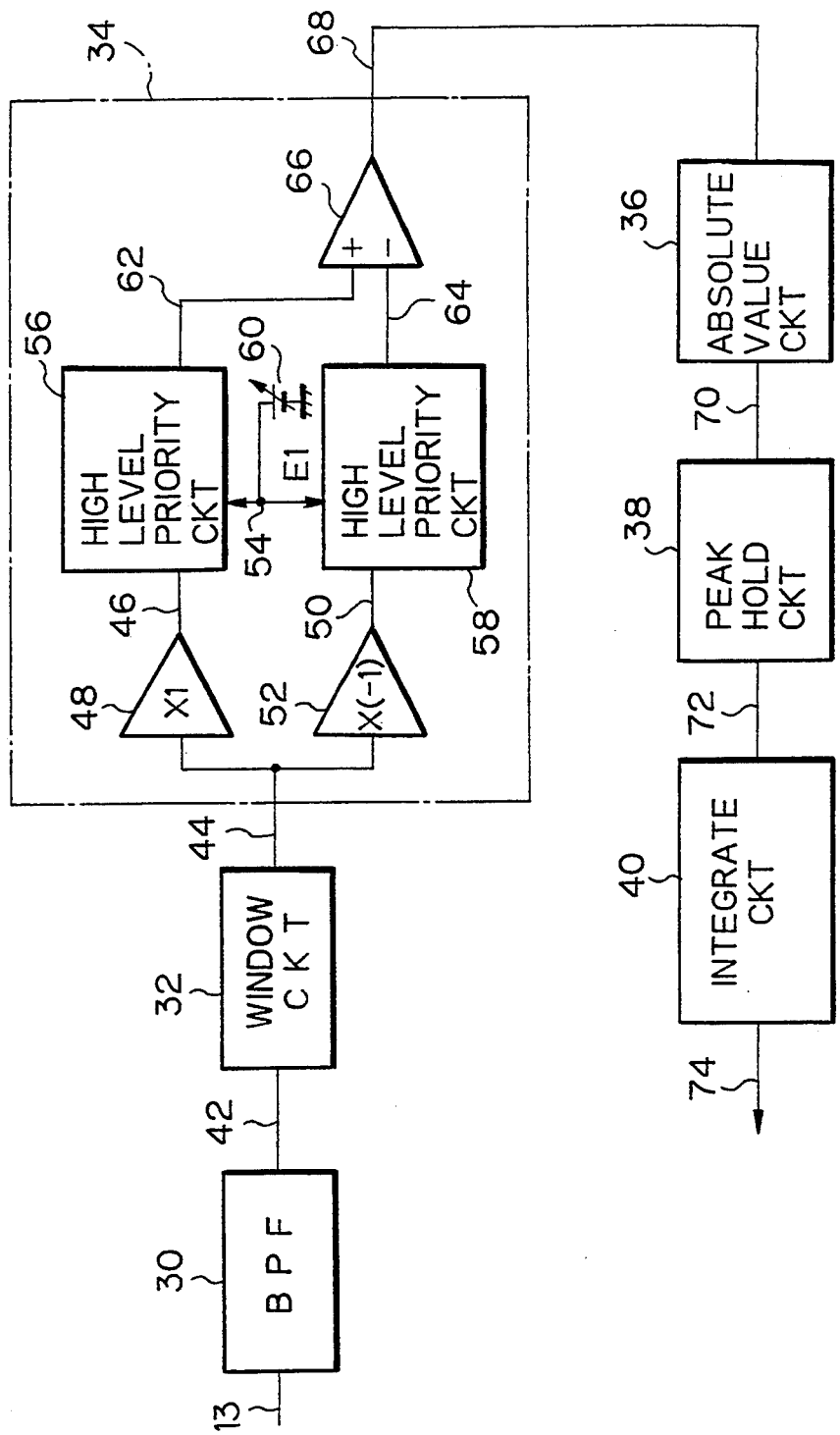
FIG. 2 is a block diagram schematically showing a specific construction of an evaluation value calculation circuit included in the embodiment.

FIG. 2 shows a specific construction of the evaluation value calculation circuit 24. As shown, the calculation circuit 24 has a band-pass filter (BPF) 30, a window processing circuit 32, a slice circuit 34, an absolute value circuit 36, a peak hold circuit 38, and an integration circuit 40. The BPF 30 receives the luminance signal Y from the video signal generating section 14 at the input terminal 13 thereof and filters out high frequency components contained therein. For example, as shown in FIG. 3C, the BPF 30 produces a signal 42 representative of contrast information from the luminance signal Y. The BPF output 42 is applied to the window processing circuit, or simply window circuit as referred to hereinafter, 32. In response, the window circuit 32 separates only a part of the BFP output 42 which lies in the focus area 104 of the picture 100, FIG. 3A. Further, the window circuit 32 amplifies the separated part of the signal 42 and produces the resulting signal on the output terminal 44 thereof. Specifically, the window circuit 32 separates a part of the BPF output 42, FIG. 3C, appearing during the horizontal scanning period of the focus area 104, and then amplifies it to produce a signal 44 shown in FIG. 3D. The signal 44 is fed to the slice circuit 34.

The slice circuit 34 removes noise components from the input signal 44 and includes an amplifier 48 for amplifying the signal 44 by an amplification of "1". The output terminal 46 of the amplifier 48 is connected to a first high level priority circuit 56. An inverting amplifier 52 amplifies the signal 44 by an amplification of "1" and then inverts the polarity of the amplified signal. The output terminal 50 of the amplifier 52 is connected to a second high level priority circuit 58. A reference voltage source 60 applies a reference voltage E1 to the input terminals 54 of the high level priority circuits 56 and 58.

As a result, the priority circuits 56 and 58 slice respectively the outputs of the amplifiers 48 and 52 on the basis of the reference voltage E1. The outputs 62 and 64 of the priority circuits 56 and 58 are respectively applied to the non-inverting input and the inverting input of a differential amplifier 66. In response, the differential amplifier 66 produces a signal representative of a difference between the two inputs 62 and 64. With this configuration, the slice circuit 34 slices the output 44 of the window circuit 32 by using the reference voltage E1. The resulting output 68 of the slice circuit 34 is free from noise components, as shown in FIG. 3E specifically. The signal 68 is applied from the slice circuit 34 to the absolute value circuit 36.

The absolute value circuit 36 generates an absolute value signal holding the absolute values of the input 68. In the illustrative embodiment, the absolute value circuit 36 detects the input 68 so as to output an absolute value signal 70 regulated to the same polarity, i.e., having only positive components, as shown in FIG. 3F specifically. On receiving the absolute value signal 70, the peak hold circuit 38 produces a peak value signal 72 holding the peak value of the input 70 for a predetermined period of time, as shown in FIG. 3G. The peak value signal 72 is applied to the integration circuit 40. The integration circuit 40 integrates the peak values of the peak value signal 72 every predetermined period of time. In this embodiment, the integration circuit 40 integrates the peak values of the signal 72 occurring during the vertical scanning period matching the focus area 104, FIG. 3A, in synchronism with the horizontal and vertical scanning signals. With this procedure, the circuit 40 calculates evaluation values for automatic focusing on a picture or field basis, thereby producing an evaluation value signal on the output terminal 74 thereof. The field-by-field evaluation value signal 74 is delivered to the decision circuit 26 as the output of the evaluation value calculation circuit 24.

In response to the field-by-field evaluation value signal 74, the decision circuit, or control circuit. 26 generates a signal for controlling the lens drive motor 28 in such a direction that the evaluation value increases. In the illustrative embodiment, the decision circuit 26 receives and temporarily stores the signal 74 representative of the evaluation value of the contrast of the object in the focus area 104, compares it with an evaluation value previously stored in the circuit 26, determines a direction in which the motor 28 is to rotate and other necessary information on the basis of the result of comparison, and then produces a corresponding motor control signal on the output terminal 78 thereof. At this instant, the motor 28 is so controlled as to increase the evaluation value represented by the signal 74 input to the decision circuit 26, as mentioned earlier. For this purpose, use may be made of a conventional control principle of the kind comparing consecutive peaks and selecting a higher one of them. On receiving the motor control signal 78, the motor 28 moves the lens 10 forward or backward via an AF (Automatic Focus) ring or similar interlocking member.

The video camera 1 having the above construction is operated as follows. When the operator of the camera 1 enters a shoot start command on a shoot switch or similar input device, not shown, the camera 1 starts shooting a desired object. To begin with, the synchronizing section 22 generates a reference signal and a composite synchronizing signal and delivers them to various circuit sections via the output terminal 21 thereof. An optical image representative of the object is incident to the photosensitive surface of the image pick-up device, not shown, included in the photosensitive section 12 via the lens 10. The photosensitive section 12 transforms the incident optical image to an electric signal pixel while producing it on the output terminal 11 thereof. The electric signal is converted to a luminance signal Y and a Chrominance signal C by the video signal generating section 14. The signals Y and C are transferred to the video signal processing section 16 together with a horizontal and a vertical scanning signal derived from the reference signal which is generated by the synchronizing section 22. At the same time, the luminance signal Y is sequentially fed from the video signal generating section 14 to the evaluation value calculation circuit 24 of the automatic focusing device 20 together with the horizontal and vertical scanning signals. In the calculation circuit 24, the BPF 30 separates high frequency components representative of contrast information from the luminance signal Y, thereby producing a BPF output 42. Then, the window section 32 extracts a part of the BPF output 42 which lies in the focus area 104, amplifies the extracted part of the signal 42 together with noise components, as shown in FIG. 3D, and then transfers the amplified signal to the slice circuit 34.

In the slice circuit 34, the output 44 of the window circuit 32 is amplified by the amplifier 48 and inverting amplifier 52. The resulting outputs of the amplifiers 48 and 52 are applied to the high level priority circuits 56 and 58, respectively. In response, the high level priority circuits 56 and 58 each slice the respective inputs by using the reference signal E1, thereby removing signal components lower than the reference voltage E1. The sliced outputs of the priority circuits 56 and 58 are respectively fed to the non-inverting input terminal 62 and the inverting input terminal 64 of the differential amplifier 66. The amplifier 66 amplifies a difference between the levels of the two inputs. The resulting output 68 of the amplifier 66 is delivered to the absolute value circuit 36.

The signal 68 sliced by the slice circuit 34 and transferred to the absolute value circuit 36 is converted to an absolute value signal 70 regulated to the positive polarity. The absolute value signal 70 is transferred to the peak hold circuit 38. The peak hold circuit 38 sequentially holds the peaks of the signal 70 every predetermined period of time. The outputs 72 of the peak hold circuit 38 are transferred to the integration circuit 40 and integrated field by field thereby. The integrated value is transferred to the decision circuit 26 via the output terminal 74 of the integration circuit 40 as a signal representative of an evaluation value for automatic focusing. In response, the decision circuit 26 stores the evaluation value represented by the signal 74 for a moment and compares it with an evaluation value previously stored therein. Then, the decision circuit 26 feeds a control signal 78 based on the result of comparison to the lens drive motor 28. As a result, the motor 28 moves the lens 10 forward or backward via the AF ring or similar interlocking member.

As a luminance signal Y is produced in the next field of the focus area 104, it is transformed to a corresponding evaluation value signal 74 in the same manner as the previous signal 74 and then fed to the decision circuit 26. Again, the decision circuit 26 controls the motor 28 on the basis of an evaluation value represented by the signal 74, thereby moving the lens 10 forward or backward. By such a procedure, the lens 10 is brought to and stopped at a position corresponding to the point where the signal 74 representative of the greatest evaluation value has been applied to the decision circuit 26. As a result, the optical image representative of the object is focused onto the photosensitive surface of the photosensitive section 12 via the lens 10. Even when the distance between the object and the camera 1 shooting it changes, the decision circuit 26 controls the motor 28 on the basis of an evaluation value matching, among others, the varying distance. This is also successful in adjusting the position of the lens 10.

In the embodiment described above, the slice circuit 34 is connected to the output terminal 44 of the window circuit 32 and the input terminal 68 of the absolute value circuit 36. Alternatively, the slice circuit 34 may be connected between the absolute value circuit 36 and the peak hold circuit 38 so as to slice the absolute value signal, i.e., to remove noise components from such a signal.

Figure 4:
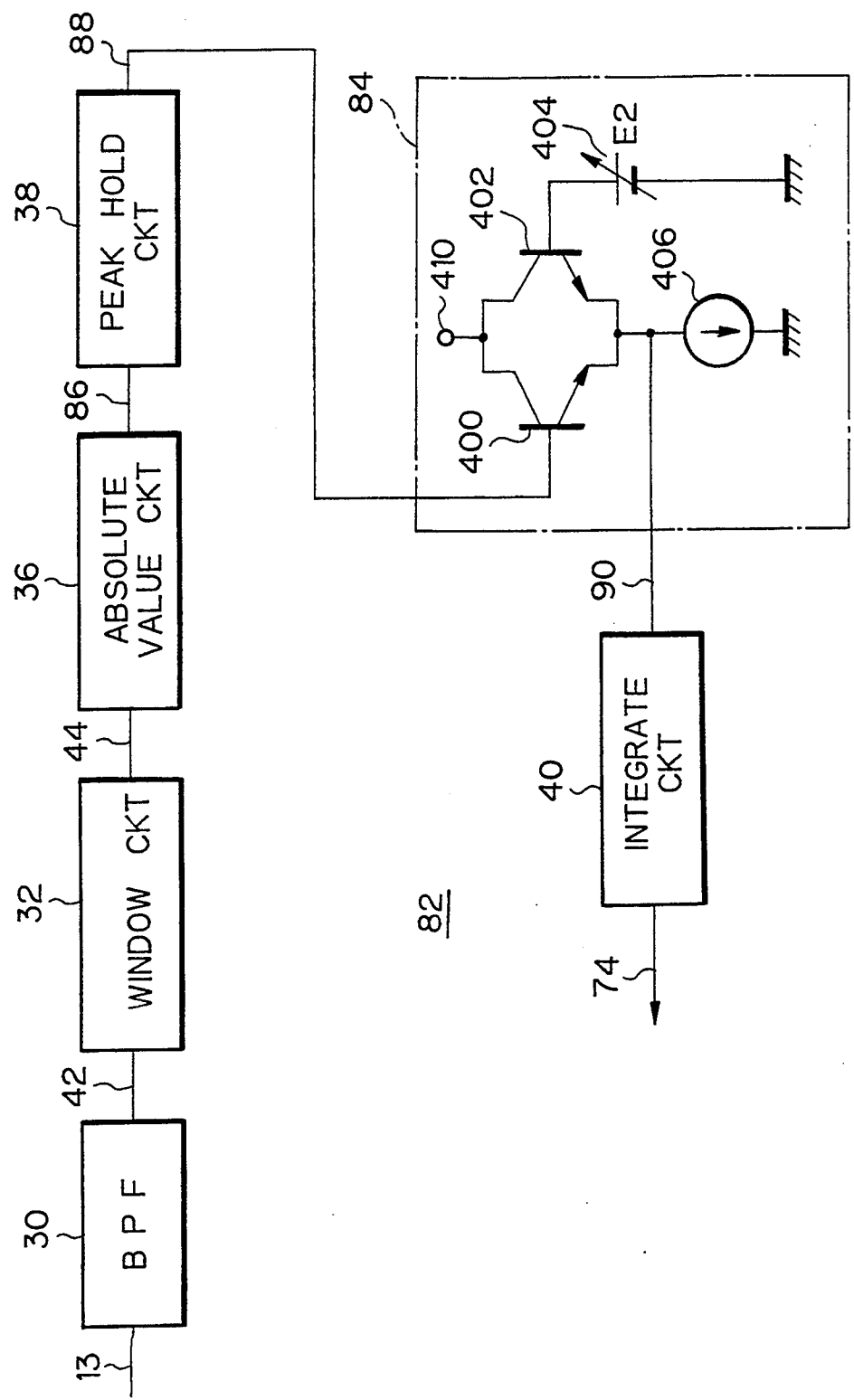
FIG. 4 is a block diagram schematically showing another specific construction of the evaluation value calculation circuit.
Figure 5A:
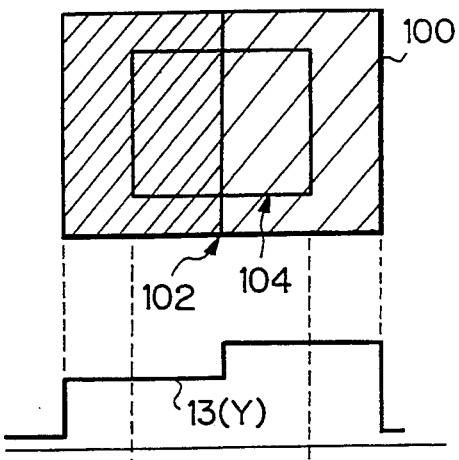

Referring to FIG. 4, another specific configuration of the evaluation value calculation circuit is shown and generally designated by the reference numeral 82. In the figure, the same constituent parts as the constituent parts of FIG. 2 are designated by the same reference numerals, and a detailed description thereof will not be made in order to avoid redundancy. As shown, the BPF 30 is connected to the window circuit 32 whose output terminal 44 is connected to the absolute value circuit 36. The peak hold circuit 38 is connected to the output terminal 86 of the absolute value circuit 36. The peak hold circuit 38 has the output terminal 88 thereof connected to a slice circuit 84 whose output terminal 90 is, in turn, connected to the integration circuit 40. The constituents of the calculation circuit 82 other than the slice circuit 84 may be identical in configuration as the constituents shown in FIG. 2. In the circuitry of FIG. 4, the absolute value circuit 36 and the peak hold circuit 38 output respectively signals 86 and 88 on which noise components are superposed, as shown in FIGS. 5E and 5F specifically.

The slice circuit 84 slices a peak value signal 88 output from the peak hold circuit 38 on the basis of a reference voltage, while producing the sliced signal on the output terminal 90 thereof. Specifically, the slice circuit 84 is made up of transistors 400 and 402, a reference voltage source 404 for generating a reference voltage E2, and a current source 406. The transistors 400 and 402 have their collectors connected to each other and to an input terminal 410 to which a source voltage is applied from the outside. The emitters of the transistors 400 and 402 are connected to the current source 406 and to the signal line 90; which is connected to the integration circuit 40 to constitute the output terminal of the circuit 84. The base 88 of the transistor 400 is connected to the output terminal of the peak hold circuit 38 as an input terminal. The base of the transistor 402 is connected to reference voltage source 404. With this configuration, the slice circuit 84 slices the voltages of the peak value signal 88 which are lower than the reference voltage, or slice level adjusting voltage, E2. As a result, a signal 90 free from noise components, as shown in FIG. 5G, appears on the output terminal of the slice circuit 84. The signal 90 is transferred from the slice circuit 84 to the integration circuit 40.

The operation of the video camera 1 having the evaluation value calculation circuit 82 will be described with reference to FIGS. 4 and 5A–5G. The camera 1 may generally be operated in the same manner as the camera 1 having the evaluation value calculation circuit 24, FIG. 2, except for the function of the calculation circuit 82. As the camera 1 starts shooting an object, the video signal generating section 14, FIG. 1, produces a luminance signal Y while, at the same time, a horizontal and a vertical scanning signal are generated. These signals are applied to the input terminal 13 of the calculation circuit 82. In response, the BPF 30 separates from the luminance signal Y high frequency components representative of the contrast information of the signal Y. The window circuit 32 separates a part of the BPF output 42 corresponding to the focus area 104, FIG. 5A, and amplifies it together with noise components (see FIG. 5D). The output 44 of the window circuit 32 is transformed to an absolute value signal 86 every predetermined period of time (see FIG. 5F). The output of the peak hold circuit 38, i.e., peak value signal 88 is fed to the base of the transistor 400 included in the slice circuit 84.

The slice circuit 84 slices the peak value signal 88 on the basis of the reference voltage E2 applied from the reference voltage source 404 to the base of the transistor 402. As a result, the voltages of the signal 88 lower than the reference voltage E2 are removed. The peak value signal free from such voltages is transferred to the integration circuit 40 via the output 90 terminal of the slice circuit 84. The integration circuit 40 integrates the peak values of the peak value signal field by field. The resulting field-by-field sum, i.e., signal 74 representative of an evaluation value is fed to the decision circuit 26. In response, the decision circuit 26 delivers a control signal 78 matching the signal 74 to the lens drive motor 28. As a result, the motor 28 moves the lens 10, FIG. 1, forward or backward in such a direction that the evaluation value increases. As this procedure is repeated, the lens 10 is brought to and stopped at a position corresponding to the point where the greatest evaluation value has been applied to the decision circuit 26.

In this embodiment, the slice circuit 84 is connected to the output terminal 88 of the peak hold circuit 38 and the input terminal 90 of the integration circuit 40. If desired, however, the slice circuit 84 may be connected between the absolute value circuit 36 and the peak hold circuit 38 so as to slice the absolute value signal, i.e., to remove noise components from such a signal.

Figure 6:
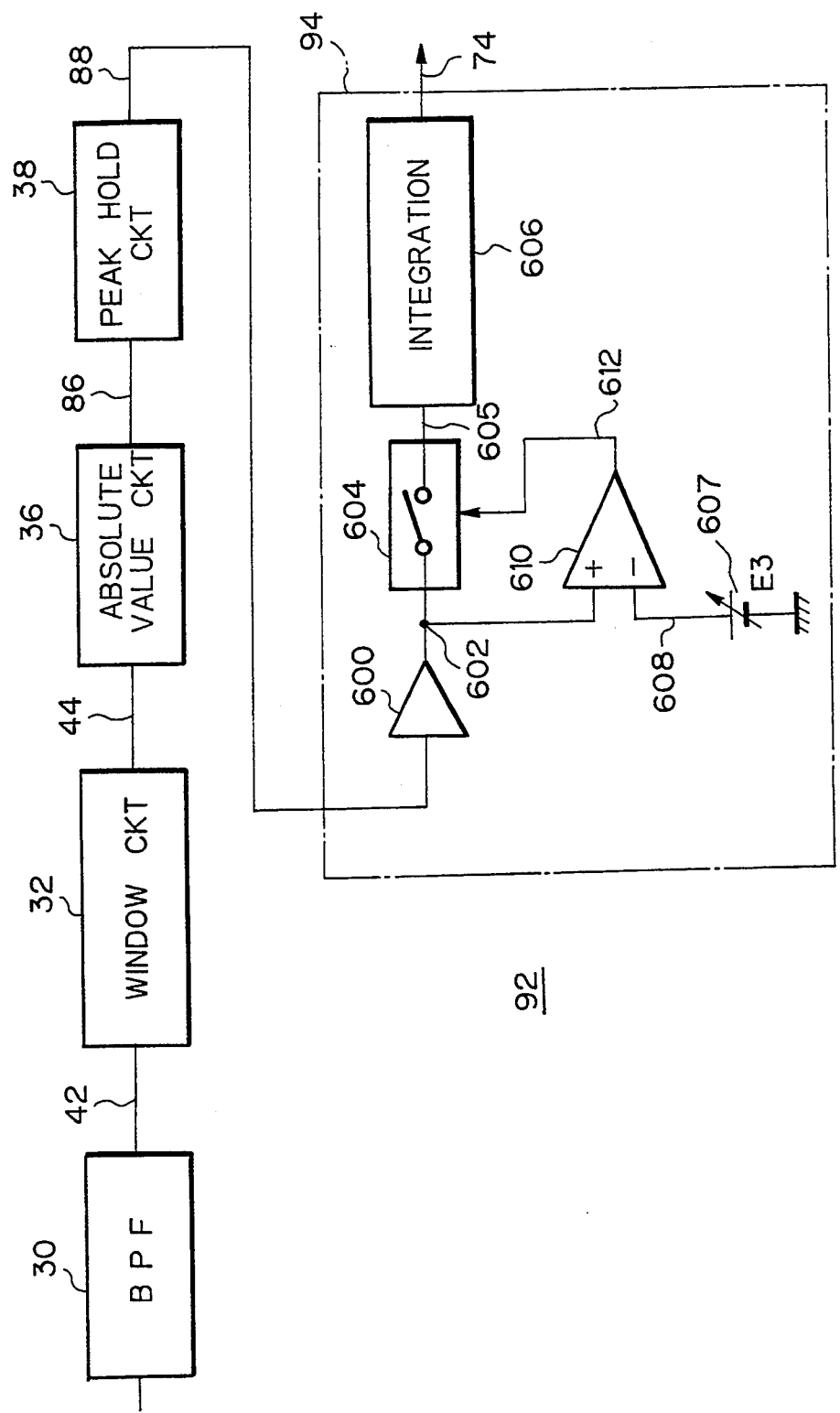
FIG. 6 is a schematic block diagram representative of another specific configuration of the evaluation value calculation circuit.

FIG. 6 shows another specific configuration of the evaluation value calculation circuit which is essentially similar to the configuration of FIG. 4 except for the following. In the figure, the same constituent pans as the parts of FIG. 4 are designated by the same reference numerals, and a detailed description thereof will not be made in order to avoid redundancy. As shown, the evaluation value calculation circuit, generally 92, lacks a slice circuit and has an integration circuit 94. The integration circuit 94 is connected to the output terminal 88 of the peak hold circuit 38 and constructed to integrate only the peak values higher than a predetermined level. Specifically, the integration circuit 94 has an amplifier 600 for amplifying the input 88 of the circuit 94. A switch 604 is connected to the output terminal 602 of the amplifier 600 for selectively switching it on or switching it off. The output terminal 605 of the switch 604 is connected to an integrating section 606 which integrates the outputs of the amplifier 600. A comparator 610 has a non-inverting input terminal 602 connected to the output terminal of the amplifier 600 and an inverting input terminal 608 connected to a reference voltage source 607 which generates a reference voltage E3. The comparator 610 compares the level of the signal applied to the non-inverting input 602 and the reference voltage E3, thereby producing a signal matching their difference on the output 612 thereof. In this sense, the amplifier 600, reference voltage source 607 and comparator 610 constitute a level detection circuit responsive to the level of the signal 88 input to the integration circuit 94. The output 612 of the comparator 610 is applied to the switch 604 to cause it to open or close. The output terminal 74 of the integrating section 606 is connected to the decision circuit 26, FI6. 1.

A reference will also be made to FIG. 7A–7C for describing the operation of the video camera 1 having the above-stated evaluation value calculation circuit 92. When the camera 1 starts shooting an object, the video signal generating section 14, FIG. 1, generates a luminance signal Y while, at the same time, a horizontal and a vertical scanning signal are generated. These signals are delivered to the evaluation value calculation circuit 92. In the calculation circuit 92, the luminance signal Y is routed through the BPF 30, window circuit 32, absolute value circuit 36 and peak hold circuit 38 to the integration circuit 94. FIG. 7B shows a specific peak value signal 88 output from the peak hold circuit 38. The peak value signal 88 is amplified by the amplifier 600 having a predetermined amplification. The amplified output 602 of the amplifier 600 is fed to the input terminal of the switch 604 and the non-inverting input terminal of the comparator 610. The comparator 610 compares the input signal 602 and the reference voltage E3. If the level of the signal 602 is higher than the reference voltage E3, the output 612 of the comparator 610 goes high. Assume that the switch 604 is of the type closing in response to the high level control signal 612. Then, the high level signal 612 causes the switch 604 to close with the result that the output 602 of the amplifier 600 is transferred to the integrating section 604 via the switch 604 and signal line 605.

If the output 602 of the amplifier 600 is lower than the reference voltage E3 as determined by the comparator 610, the output 612 of the comparator 610 goes low. Then, assuming that the switch 604 is of the type opening in response to the low level control signal 612, the switch 604 is opened to intercept the output 602 of the amplifier 600. FIG. 7C shows the resulting signal 605 input to the integrating section 606; signal components lower than the reference voltage E3 have been removed from the signal 605. The integrating section 606 integrates the input signals 605 every predetermined period of time, e.g., every field. A signal representative of the result of integration appears on the output terminal 74 of the integration circuit 94 as an evaluation value signal. The decision circuit 26, FIG. 1, generates the control signal 78 for controlling the motor 28 by the previously mentioned principle in response to the evaluation value signal 74, as in any one of the previously stated evaluation value calculation schemes. The motor 28 shifts the lens 10 in response to the control signal 78.

As stated above, the camera 1 with any one of the circuitry shown in FIGS. 2–6 generates a video signal representative of an optical image focused by the lens 10 accurately. The video signal appearing on the output terminal 15 of the video signal processing section 16 is fed to the recording section 18. The recording section 18 converts the input video signal to a signal adaptive to, for example, a magnetic tape and then writes it on the tape via a magnetic head.

Figure 8A:
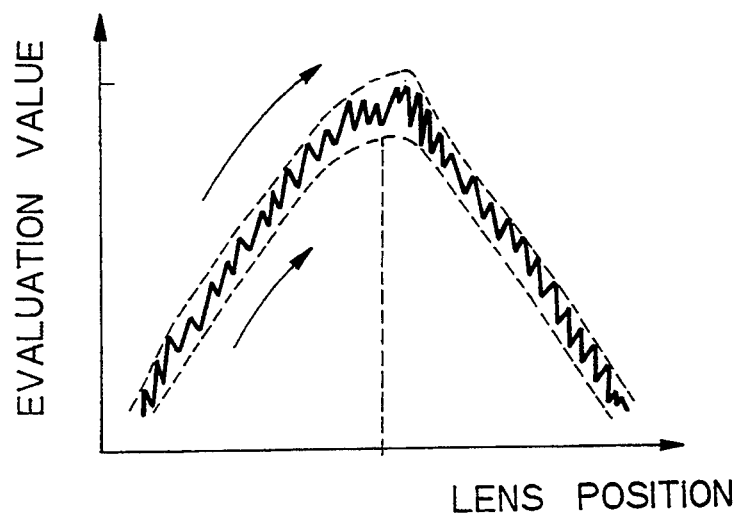
FIGS. 8A and 8B show respectively a relation between the lens position and the evaluation value particular to a conventional automatic focusing device and a r,elation achievable with the present invention.
Figure 8B:
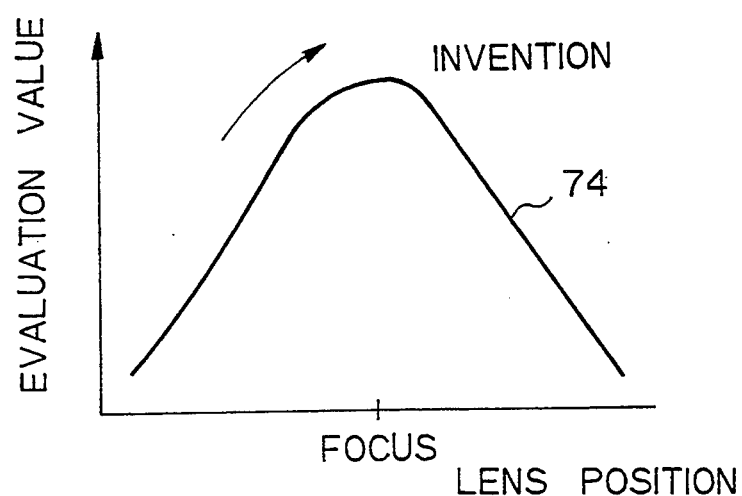

As described above, to focus an optical image incident via the lens 10 onto the photosensitive section 12 accurately, the embodiment produces evaluation values representative of focus conditions from contrast information from which noise components have been removed. Specifically, each evaluation value is the integrated value of contrast information representative of the contrast of an object. The embodiment, therefore, improves the signal-to-noise (S/N) ratio by removing noise components contained in the contrast information from a luminance signal. Since the noise components amplified together with the luminance signal are removed, accurate contrast information is achievable particularly when the illumination is low, i.e., when the luminance signal level is low. Hence, accurate contrast information is provided at each position of the lens 10, insuring an accurate greatest evaluation value which is faithfully representative of a focal, point. FIGS. 8A and 8B show respectively a relation between the lens position and the evaluation value particular to a conventional system and a relation achievable with the embodiment. As the evaluation value curves indicate, the embodiment produces evaluation values each matching a particular position of the lens 10 accurately and, therefore, allows an accurate evaluation curve to be drawn. Particularly, considering the fact that the greatest evaluation value is further reduced when the luminance level is low and the object has a low contrast, the embodiment is hardly susceptible to noise and provides an accurate greatest evaluation value. This insures accurate control of the kind previously stated over a video camera used to shoot a moving object and, therefore, over the position of the lens 10. Particularly, the circuitry shown in FIG. 6 can use all the input signals effectively for contrast detection and, therefore, further improves the accuracy of automatic focusing.

In summary, it will be seen that the present invention provides an automatic focusing device which separates a contrast signal, removes noise components from the contrast signal to improve the S/N ratio, and then integrates such contrast signals to calculate an evaluation value for focusing. The device, therefore, produces accurate evaluation values each matching a particular position of a lens, thereby determining the greatest evaluation value with accuracy. Hence, even when the illumination of a desired object is too low to provide sufficient contrast information, the device of the present invention enhances accurate and rapid focusing to an unprecedented degree. This is true with both of a video camera for shooting a moving object and a still camera for shooting a still object.

While the present invention has been described with reference to the particular illustrative embodiment, it is not to be restricted by the embodiments but only by the appended claims. It is to be appreciated that those skilled in the art can change or modify the embodiment without departing from the scope and spirit of the present invention. For example, while the embodiment has concentrated on a video camera, it is also practicable with a still camera or similar imaging apparatus. Then, the still camera may be constructed to move a lens thereof before a shot, calculate an evaluation value at a plurality positions of the lens, select the greatest one of the evaluation values by, for example, calculation, and then stop the lens at a position matching the greatest evaluation value. This is successful in producing an accurate evaluation value and, therefore, in focusing a still picture accurately and rapidly even when the luminance level and, therefore, contrast information is short.

The reference voltage source 60, 404 or 607 may have the reference voltage E1, E2 or E3 thereof changed in matching relation to the level of the signal to be sliced or compared. For example, the reference voltage E1, E2 or E3 may be changed on the basis of the gain of the amplifier for amplifying the video signal or the luminance signal or may be changed manually.

What is claimed is:

1. An automatic focusing device for focusing an image of an object incident on an image pick-up device via a lens, comprising:
   contrast information separating means for separating a contrast signal representative of a contrast from a luminance signal generated by said image pick-up device;
   extracting means for extracting a predetermined part of said contrast signal lying in a focus area which is defined in a picture represented by said contrast signal;
   removing means for removing noise components of a predetermined level from the extracted part of said contrast signal, said removing means comprising
      a reference voltage source for generating a reference voltage defining said predetermined level,
      first slicing means for slicing said extracted part of said contract signal by using said reference voltage,
      second slicing means for inverting said extracted part of said contrast signal and then slicing said inverted extracted part by using said reference voltage, and
      differential amplifying means for amplifying a difference between an output of said first slicing means and an output of said second slicing means which are respectively applied to a non-inverting input terminal and an inverting input terminal of said differential amplifying means;
   integrating means for integrating outputs of said differential amplifying means, from which the noise components of said predetermined level have been removed, to thereby calculate an evaluation value for focusing;
   deciding means for determining a focus condition on the basis of said evaluation value produced by said integrating means, and then selecting a direction in which said lens is to be removed; and
   driving means for driving said lens on the basis of a result of decision of said deciding means.

2. The automatic focusing device as claimed in claim 1, further comprising absolute value means for converting said extracted part of said contrast signal to a same polarity, said removing means removing the noise components of said predetermined level from said polarity converted extracted part of said contrast signal.

3. The automatic focusing device as claimed in claim 1, wherein the image is automatically focused when capturing a movie image of the object.

4. The automatic focusing device as claimed in claim 1, wherein the image is automatically focused when capturing a still image of the object.

5. The automatic focusing device as claimed in claim 1, wherein said reference voltage generated by said reference voltage source is variable.

6. An automatic focusing device for focusing an image of an object incident on an image pick-up device via a lens, comprising:
   contrast information separating means for separating, from a picture represented by a luminance component of a video signal generated by said image pick-up device, high frequency components of said luminance component which are representative of contrast information to thereby produce a contrast signal;
   extracting means for extracting a predetermined part of said contrast signal lying in a focus area which is defined in said picture;
   removing means for removing noise components of a predetermined level from the extracted part of said contrast signal to thereby calculate an evaluation value for focusing, said noise removing means comprising
      a reference voltage source for generating a reference voltage defining said predetermined level,
      first slicing means for slicing said extracted part of said contrast signal by using said reference voltage.
      second slicing means for inverting said extracted part of said contrast signal and then slicing said inverted extracted part by using said reference voltage, and
      differential amplifying means for amplifying a difference between an output of said first slicing means and an output of said second slicing means which are respectively applied to a non-inverting input terminal and an inverting input terminal of said differential amplifying means to output said evaluation value; deciding means for determining a focus condition on the basis of said evaluation value produced by said removing means, and then selecting a direction in which said lens is to be moved; and
   driving means for driving said lens on the basis of a result of decision of said deciding means.

7. The automatic focusing device as claimed in claim 6, wherein the image is automatically focused when capturing a movie image of the object.

8. The automatic focusing device as claimed in claim 6, wherein the image is automatically focused when capturing a still image of the object.

9. The automatic focusing device as claimed in claim 6, wherein said reference voltage generated by said reference voltage source is variable.

10. An automatic focusing method for focusing an image of an object incident on an image pick-up device via a lens, comprising the steps of:
    (a) separating a contrast signal representative of a contrast from a luminance signal generated by the image pick-up device;
    (b) extracting a predetermined part of the contrast signal lying in a focus area which is defined in a picture represented by the contrast signal;
    (c) removing noise components of a predetermined level from the extracted part of the contrast signal comprising the steps of
       (c1) generating a reference voltage for defining the predetermined level,
       (c2) slicing the extracted part of the contrast signal by using the reference voltage.
       (c3) inverting the extracted part of the contrast signal and then slicing the inverted extracted part by using the reference voltage, and
       (c4) amplifying a difference between signals produced in said steps (c2) and (c3);

(d) integrating a signal produced in said step (c4) to thereby calculate an evaluation value for focusing;

(e) determining a focus condition on the basis of the evaluation value produced in said step (d) and then selected a direction in which the lens is to be moved; and (f) driving the lens on the basis of a result of the selection of said step (e).

11. The automatic focusing method as claimed in claim 10, further comprising converting the extracted part of the contrast signal to a same polarity, said step (c) removing the noise components of the predetermined level from the polarity converted extracted part of the contrast signal.

12. The automatic focusing method as claimed in claim 10, wherein the image is automatically focused when capturing a movie image of the object.

13. The automatic focusing method as claimed in claim 10, wherein the image is automatically focused when capturing a still image of the object.

14. The automatic focusing method as claimed in claim 10, wherein the reference voltage generated in said step (c) is variable.

15. An automatic focusing method for focusing an image of an object incident on an image pick-up device via a lens, comprising:

(a) separating, from a picture represented by a luminance component of a video signal generated by the image pick-up device, high frequency components of the luminance component which are representative of contrast information to thereby produce a contrast signal;

(b) extracting a predetermined part of the contrast signal lying in a focus area which is defined in the picture;

(c) removing noise components of a predetermined level of the extracted part of the contrast signal to thereby calculate an evaluation value for focusing, comprising the steps of (c1) generating a reference voltage for determining the predetermined level, (c2) slicing the extracted part of the contrast signal by using the reference voltage, (c3) inverting the extracted part of the contrast signal and then slicing the inverted extracted part by using the reference voltage, and (c4) amplifying a difference between signals produced in said steps (c2) and (c3) to produce an evaluation value;

(d) determining a focus condition on the basis of the evaluation value produced in said step (c4) and then selecting a direction in which the lens is to be moved; and (e) driving the lens on the basis of a result of said step (d).

16. The automatic focusing method as claimed in claim 15, wherein the image is automatically focused when capturing a movie image of the object.

17. The automatic focusing method as claimed in claim 15, wherein the image is automatically focused when capturing a still image of the object.

18. The automatic focusing method as claimed in claim 15, wherein the reference voltage generated in said step (c1) is variable.

* * * * *